United States Patent [19]
Ninomiya et al.

[11] Patent Number: 5,691,092
[45] Date of Patent: Nov. 25, 1997

[54] METHOD FOR PRODUCING OPTICAL ELEMENT

[75] Inventors: Masanobu Ninomiya; Ryojiro Akashi; Takashi Morikawa; Takashi Uematsu, all of Kanagawa, Japan

[73] Assignee: Fuji Xerox Co., Ltd., Tokyo, Japan

[21] Appl. No.: 545,157

[22] Filed: Oct. 19, 1995

[30] Foreign Application Priority Data

Dec. 2, 1994 [JP] Japan .................................. 6-324028
Jan. 20, 1995 [JP] Japan .................................. 7-024483

[51] Int. Cl.$^6$ ..................................................... G02F 1/13
[52] U.S. Cl. ........................... 430/20; 430/321; 427/162; 427/164; 427/177; 427/372.2; 427/487
[58] Field of Search ..................... 430/20, 321; 427/162, 427/164, 177, 372.2, 379, 385.5, 487, 492, 521, 522

[56] References Cited

U.S. PATENT DOCUMENTS

| | | | |
|---|---|---|---|
| 5,039,208 | 8/1991 | Ohnishi et al. | 359/100 |
| 5,073,219 | 12/1991 | McArdle et al. | 156/242 |
| 5,359,443 | 10/1994 | Toyooka et al. | 359/76 |

FOREIGN PATENT DOCUMENTS

| | | |
|---|---|---|
| A-54-11377 | 1/1979 | Japan . |
| A-59-10930 | 1/1984 | Japan . |
| A-60-180887 | 9/1985 | Japan . |
| A-61-237684 | 10/1986 | Japan . |
| A-62-14114 | 1/1987 | Japan . |
| A-63-223066 | 9/1988 | Japan . |
| 1-134425 | 5/1989 | Japan . |
| A-2-2513 | 1/1990 | Japan . |
| A-2-42415 | 2/1990 | Japan . |
| A-4-218024 | 8/1992 | Japan . |
| 5-323253 | 12/1993 | Japan . |
| A-6-18866 | 1/1994 | Japan . |

OTHER PUBLICATIONS

*Japan Display*, T. Ueno et al., "Thermo–Optical Effect in Polymeric Liquid Crystal to Display Applications", (1986), pp. 290–292.

*Makromol. Chem.*, Zentel et al., "Stress–induced orientation in lightly crosslinked liquid–crystalline side–group polymers", (1987), vol. 188, pp. 665–674.

*Makromol. Chem.*, Finkelmann et al., "Model Considerations and Examples of Enantiotropic Liquid Crystalline Polymers", (1978), vol. 179, pp. 273–276.

*Mol. Cryst., Liq. Cryst.*, T. Nakamura et al., "Application of Side Chain Type Liquid Crystal Polymer for Display and recording Devices", (1989), vol. 169, pp. 167–192.

Polymer, "Modification of the properties of some polyblends and reinforced polymers", vol. 24, Mar. (1983), D. Feldman, pp. 359–363.

Eur. Polym. J., "Thermotropic Liquid–Crystalline Polymers–VI", vol. 18, (1982), Valery P. Shibaev et al., pp. 651–659.

Makromol. Chem., Rapid Commun., "Liquid Crystalline Elastomers–A New Type of Liquid Crystalline Material", vol. 2, (1981), Heino Finkelmann et al., pp. 317–322.

*Primary Examiner*—John A. McPherson
*Attorney, Agent, or Firm*—Oliff & Berridge

[57] ABSTRACT

A method for producing an optical element, the method comprising the steps of: forming a liquid crystal polymer layer on a sheet-form substrate; forming a surface protective layer on the liquid crystal polymer layer; and carrying out a heat-treatment for crosslinking the liquid crystal polymer, or the method comprising the steps of: forming a liquid crystal polymer layer on a sheet-form substrate; carrying out a first heat-treatment for controlling the multidomain structure of the liquid crystal polymer layer; forming a surface protective layer on the liquid crystal polymer layer; and carrying out a second heat-treatment for crosslinking the liquid crystal polymer layer.

12 Claims, 1 Drawing Sheet

METHOD FOR PRODUCING OPTICAL ELEMENT

FIELD OF THE INVENTION

The present invention relates to a method for producing an optical element having a liquid crystal polymer layer capable of reversibly controlling the light scattering property by an external action.

BACKGROUND OF THE INVENTION

Recently, a rewritable recording medium capable of reversibly recording and erasing images is being watched with keen interest and a thermal rewritable recording material for recording and erasing images using a heating means such as a thermal head, etc., has been developed.

As these heat-sensitive recording materials, a recording material using a liquid crystal polymer as a recording layer (as described in JP-A-4-218024) (the term "JP-A" as used herein means an "unexamined Japanese patent application"), a recording material using a composite film formed by dispersing an organic low-molecular compound in a resin matrix as a recording layer (as described in JP-A-54111377), a recording material using a leuco dye for a recording layer (as described in JP-A-61-237684), a recording material using a high molecular weight film formed by blending two kinds of polymers as a recording layer (as described in JP-A-60-180887), etc., are proposed. In these techniques, the thermal rewritable recording material using a liquid crystal polymer is particularly preferable since the recording material is excellent in the optical properties and the durability.

Applications of the liquid crystal polymers to recording materials, display materials, etc., have been investigated as novel functional materials and, for example, the liquid crystal polymers being applied for recording materials (as described in JP-A-59-10930 and JP-A-63-223066) and the liquid crystal polymers being applied for display materials (as described in JP-A-62-14114, JP-A-2-2513, *Polym. Commun.*, Vol. 24, p. 364 (1983), *Japan Display*, p. 290 (1986), etc.) are disclosed.

The techniques for crosslinking a liquid crystal polymer are disclosed in *Makromol. Chem. Rapid Commun.*, Vol. 2, p. 317 (1981), *Makromol. Chem.*, Vol. 188, p. 665 (1987), etc., and the applications thereof to elastomers, light modulation elements, and recording elements have been expected. A recording element capable of reducing the damages by a thermal head by crosslinking a main-chain type liquid crystal polymer is known as described in JP-A-2-42415.

Hitherto, in the method for producing an optical element by coating a liquid crystal polymer on a sheet-form substrate such as a film, etc., and drying to form a recording layer, from the view point of the production efficiency, continuous coating using a line coater is preferable, a wound film in a roll form is employed for substrate and recording material is coated on feeding film using a linear coater, and after drying winding again the film having formed thereon the recording layer in a roll form is employed, and in this ease, the heat-treatment for crosslinking is applied to the film having formed thereon the recording layer in the state of wound in a roll form.

However, in the case of applying the heat-treatment in the state of winding the film having formed therein the recording layer in a roll form, when the heat-treatment temperature is set up to an efficient temperature, the adhesive property of the liquid crystal polymer layer formed is increased, and thus there is a problem that when the film having formed thereon the recording layer is unwound from the roll in the next step, the liquid crystal polymer layer is released and the film substrate is bent or cut.

The multidomain structure formed in a liquid crystal polymer largely takes part in the light scattering faculty of an optical element using the liquid crystal polymer and for increasing the optical characteristics of the optical element, it is necessary that the multidomain structure is most suitably controlled.

In general, a liquid crystal polymer layer is formed by coating a coating solution using a solvent, drying by heating, etc., but in particular, when a liquid crystal polymer having a high internal viscosity is used for a light scattering layer, it is difficult to obtain the optimum multidomain structure having a high scattering property.

SUMMARY OF THE INVENTION

An object of the present invention is to provide an efficient method for producing an optical element using a liquid crystal polymer for the high-resisting recording layer having improved optical characteristics, durability, and recording/erasing characteristics, etc., by carrying out the heat-treatment for crosslinking the liquid crystal polymer under a specific condition.

Another object of the present invention is to provide a heat-treatment method for producing a composition having a high light-scattering property by controlling the multidomain structure of a composition composed of a liquid crystal polymer.

Still another object of the present invention is to provide a heat-treatment method for producing a composition for an optical element having excellent optical characteristics by growing the domain of a liquid crystal polymer composition efficiently and in a short time, whereby the multidomain structure is controlled.

Other objects and effects of the present invention will be apparent from the following description.

The present invention relates to, as a first aspect, a method for producing an optical element, the method comprising the steps of:

forming a liquid crystal polymer layer on a sheet-form substrate;

forming a surface protective layer on the liquid crystal polymer layer; and carrying out a heat-treatment for crosslinking the liquid crystal polymer.

The present invention also relates to, as a second aspect, a method for producing an optical element, the method comprising the steps of:

forming a liquid crystal polymer layer on a sheet-form substrate;

carrying out a first heat-treatment for controlling the multidomain structure of the liquid crystal polymer layer;

forming a surface protective layer on the liquid crystal polymer layer; and carrying out a second heat-treatment for crosslinking the liquid crystal polymer layer.

In the second aspect of the present invention, it is preferred that the temperature of the first heat-treatment for controlling the multidomain structure is higher than the temperature of the second heat-treatment for crosslinking the liquid crystal polymer layer.

As the first heat-treatment in the second aspect of the present invention, the following embodiments are preferred:

the first heat-treatment for controlling the multidomain structure is carried out at a temperature range of lower than the isotropic phase-liquid crystal phase phase-transition temperature Ti and not lower than Ti–20° C.;

the first heat-treatment for controlling the multidomain structure is a heat-treatment comprising continuously decreasing the temperature from a temperature higher than the isotropic phase-liquid crystal phase phase-transition temperature Ti of the liquid crystal polymer at a temperature decreasing rate of not higher than 20° C. per second; and the first heat-treatment for controlling the multidomain structure is a heat-treatment comprising the steps of continuously decreasing the temperature from a temperature higher than the isotropic phase-liquid crystal phase phase-transition temperature Ti at a temperature decreasing rate of not higher than 20° C. per second; and thereafter treating at a temperature lower than the isotropic phase-liquid crystal phase phase-transition temperature Ti and not lower than Ti–20° C.

DETAILED DESCRIPTION OF THE INVENTION

The optical element of the present invention comprises at least three layers, i.e., a sheet-form substrate, a liquid crystal polymer layer (recording layer) composed of a liquid crystal polymer, and a surface protective layer.

Figure 1:
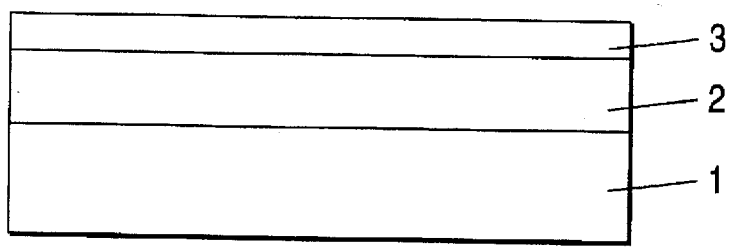
FIG. 1 is an enlarged schematic cross sectional view showing an embodiment of the optical element prepared using the method of the present invention.
Figure 2:
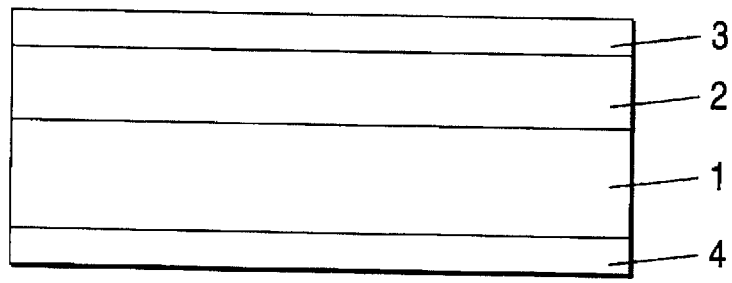
FIG. 2 is an enlarged schematic cross sectional view showing another embodiment of the optical element prepared using the method of the present invention.
Figure 3:
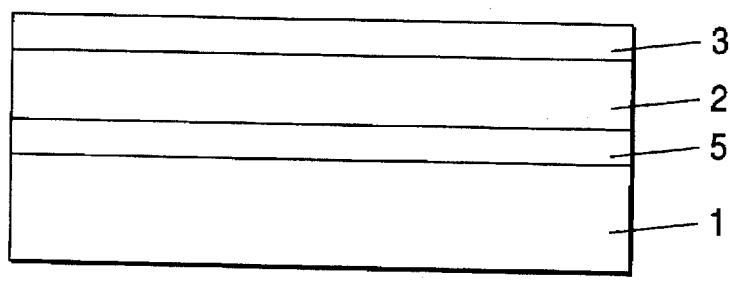
FIG. 3 is an enlarged schematic cross sectional view showing still another embodiment of the optical element prepared using the method of the present invention.

FIG. 1 to FIG. 3 of the accompanying drawings show the construction embodiments of the optical elements of the present invention. In these figures, numeral 1 denotes a sheet-form substrate, 2 denotes a liquid crystal polymer layer, 3 denotes a surface protective layer, 4 denotes a colored layer, and 5 denotes a light reflection layer.

FIG. 1 is an embodiment of the optical element of the present invention having the construction that a recording layer comprising the liquid crystal polymer layer 2 is laminated on the substrate 1 and further the protective layer 3 for improving the surface strength and the heat resistance is formed thereon. FIG. 2 is another embodiment of the optical element of the present invention having the construction that the colored layer 4 is further formed on the back surface of the substrate 1 having formed on the front surface the liquid crystal polymer layer 2 as shown in FIG. 1. FIG. 3 is still another embodiment of the optical element of the present invention having the construction that the light reflection layer 5 is formed between the substrate 1 and the liquid crystal polymer layer 2 in FIG. 1.

A liquid crystal polymer material constituting the recording layer composed of the liquid crystal polymer being used in the present invention is explained.

As liquid crystal polymers, a main-chain type liquid crystal polymer having a mesogenic group (a molecule showing a liquid crystal property) in the main chain, a side-chain type liquid crystal polymer having a mesogenic group bonded to the side chain, etc., are known. In the present invention, the side-chain type liquid crystal polymer is particularly preferably used.

As the side-chain liquid crystal polymer being used in thus invention, the liquid crystal polymers each constituted by the repeating structure unit shown by Structural Example 1, Structural Example 2 or Structural Example 3 described below are preferably used.

Structural Example 1

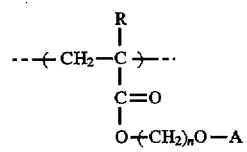

Structural Example 2

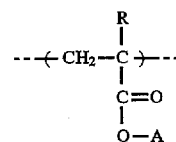

Structural Example 3

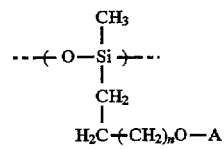

wherein R represents a hydrogen atom or a methyl group; n represents an integer of from 1 to 30; and A represents a mesogenic group selected from following formulae (a) to (k):

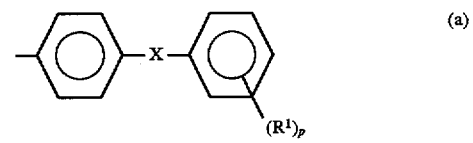

(a)

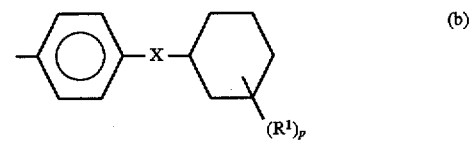

(b)

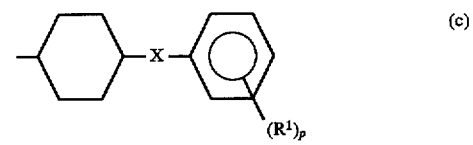

(c)

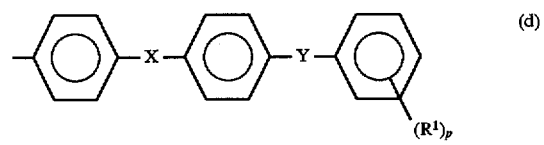

(d)

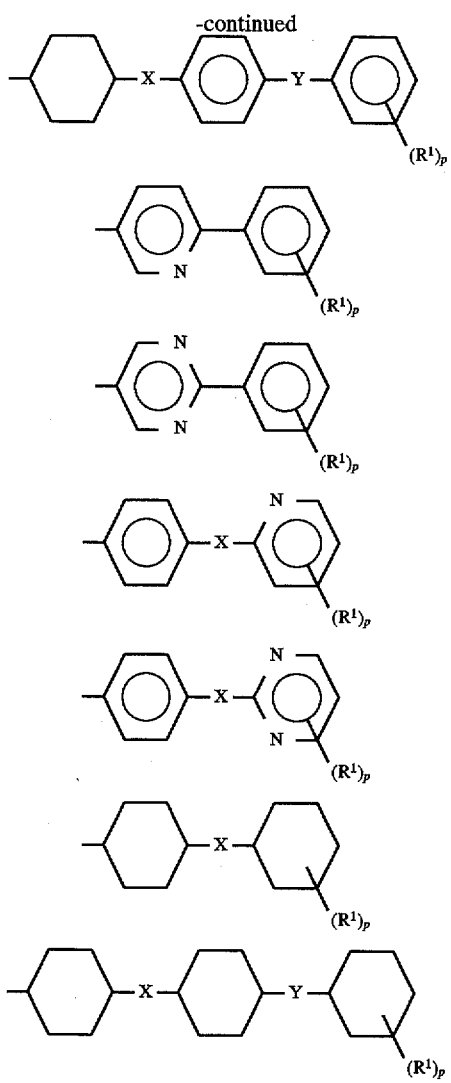

wherein X and Y may be the same or different and each represents a single bond, —N=N—, —N(—O)=N—, —CH=N—, —N=CH—, —COO—, —O(C=O)—, or an ethynylene group; $R^1$ represents an alkoxy group, a halogen atom, a cyano group, a carboxy group, or an alkyl group; p represents an integer of from 1 to 5; and when p is 2 or more, plural groups represented by $R^1$ may be the same or different.

In the present invention, it is preferred to use the liquid crystal polymer having copolymerized a non-mesogenic group at the side chain obtained by copoymerizing a mesogenic monomer and a non-mesogenic monomer. Such liquid crystal polymers are disclosed in JP-A-4-218024 and JP-A-6-18866. When these liquid crystal polymers are used, the contrast of the recorded images is greatly increased and the heat-sensitive properties can be optimized.

Furthermore, in the present invention, it is preferred to form a recording layer comprising the liquid crystal polymer and then crosslink the recording layer. It is particularly preferred to use a crosslinked liquid crystal polymer having a multidomain structure. By crosslinking the liquid crystal polymer as a multidomain structure composed of an assembly of domains each having an optical anisotropy and a specific size, a liquid crystal polymer capable of realizing high-speed and stable recording and erasing can be obtained.

The crosslinking of the liquid crystal polymer can be carried out by a method of forming the liquid crystal polymer as a recording layer and thereafter, crosslinking the recording layer by an external action such as heat, light, electron beams, etc. In the present invention, as the liquid crystal polymer, a compound having a reactive group as one component of the main chain or the side chain can be used. In the case of using such a compound, the crosslinking can be carried out by utilizing the reactive group, if necessary, by adding thereto a catalyst and a polyfunctional reactive compound.

Preferred examples of the reactive group include a vinyl group, an acrylate group, a methacrylate group, a heterocyclic group such as an epoxy group, etc., a group capable of addition or polymerization, such as an isocyanate group, etc., a hydroxy group, an amino group, an acid amide group, a thiol group, a carboxy group, a sulfonic acid group, a phosphoric acid group, a metal alcoholate group, and a magnesium halide group (Grignard reagent) are preferred. Examples of the catalyst that is used if desired include various kinds of ultraviolet polymerization initiators, thermal polymerization initiators, etc. Preferred examples of the polyfunctional reactive compounds include polyfunctional isocyanate compounds, polyfunctional epoxy compounds, polyfunctional melamine compounds, polyfunctional aldehyde compounds, polyfunctional amine compounds, polyfunctional carboxyl compounds, etc. The amounts of the catalyst and the polyfunctional reactive compound are preferably in the range of from 0.01 to 30% by weight based on the amount of the composition of the liquid crystal polymer.

The method for producing the liquid crystal polymer being used in the present invention is explained.

The side-chain type liquid crystal polymer described above can be produced by usually polymerizing a polymerizable mesogenic monomer or adding a mesogenic compound capable of causing an addition reaction to a reactive polymer such as a hydrogenated polysilicone. Such techniques are disclosed in *Makromol. Chem.*, Vol. 179, p. 273 (1978), *Eur. Polym. J.*, p. 651 (1982), *Mol. Cryst. Liq. Cryst.*, Vol. 169, p. 167 (1989), etc.

The liquid crystal polymer used in the present invention can be produced by the same manner as the method described above. As the mesogenic monomer and the mesogenic compound capable of causing an addition reaction described above, various compounds can be used such as rigid molecules (mesogenic groups of a biphenyl series, a phenyl benzoate series, a cyclohexylbenzene series, an azoxybenzene series, an azobenzene series, an azomethine series, a phenylpyrimidine series, a diphenylacetylene series, a biphenylbenote series, a cyclohexylbiphenyl series, a terphenyl series, etc., bonded with an acrylic acid ester group, a methacrylic acid ester group, or a vinyl group, preferably, via an alkyl spacer having a definite length.

Specific structural examples of these compounds are shown below but the invention is not limited to them.

$CH_2=C(Ra)$—COO—$(CH_2)_l$—O—A $CH_2=C(Ra)$—COO—A $CH_2=CH$—$(CH_2)_l$—O—A wherein Ra represents a hydrogen atom or a methyl group; l represents an integer of from 1 to 30; and A has the same meanings as the mesogenic group in the Structural Example 1.

In the production of the liquid crystal polymer of the present invention, the non-mesogenic monomer or the non-mesogenic compound which is preferably copolymerized or co-added with the foregoing mesogenic compound for improving the characteristics and for crosslinking is preferably a compound useful for improving the contrast of the recorded images and for optimizing the thermal characteristics. Examples thereof include alkyl (meth)acrylates and derivatives thereof, styrene and derivatives thereof, vinyl acetate, (meth)acrylonitrile, vinyl chloride, vinylidene chloride, vinylpyrrolidone, 1-hexene, 1-octone, etc., and compounds each having a reactive group for crosslinking, such as (meth)acrylic acid, ω-carboxy-polycaprolactone mono(meth)acrylate, vinyl sulfonate, hydroxyethyl (meth) acrylate, hydroxypropyl (meth)acrylate, 2-(meth) acryloxyethyl acid phosphate, 2-hydroxy-3-phenoxypropyl (meth)acrylate, 2-(meth)acryloxyethyl succinate, phthalic acid mono(meth)acrylate, 2-(meth)acryloxyethyl(2-hydroxyethyl)phthalate, 4-(meth)acryloxyalkyloxy-benzoic acid, glyceryl (meth)acrylate, hydroxy-substituted styrene, (meth)acrylamide, N,N-dimethylaminoethyl (meth)acrylate, N,N-diethylaminoethyl (meth)acrylate, glycidyl (meth) acrylate, 2-propen-1-ol, 5-hexen-1-ol, etc., although the compounds being used in the present invention are not limited to these compounds.

The term "(meth)acryl" and the like used herein means "acryl and methacryl" and the like.

For copolymerizing the foregoing compound with the mesogenic monomer or co-adding the compound to the liquid crystal polymer, the amount of the compound is preferably in the range of from 0.1 to 70 mol % as a monomer unit based on the total monomer units.

The liquid crystal polymer used in the present invention can be produced by homopolymerization or copolymerization by radical polymerization or ion polymerization, or an addition reaction to a reactive polymer using the foregoing monomers and reactive compounds.

The weight-average molecular weights of these liquid crystal polymers are generally in the range of from 1,000 to 1000,000, and preferably from 10,000 to 500,0000. The mode of polymerization in the case of copolymerization can be known various forms such as a random copolymerization, a graft copolymerization, a block copolymerization, an alternating copolymerization, etc.

Various components can be added to the liquid crystal polymer layer for the purpose of improving the characteristics thereof. For example, various antioxidants such as hindered amine, hindered phenol, etc., may be added thereto for the purpose of improving the weather resistance and also various dichroism dyes such as anthraquinone dyes, styryl dyes, azomethine dyes, azo dyes, etc., may be added for improving the contrast of the display. Various fluorescent dyes may be added for improving the light scattering property. Furthermore, in the case of efficiently carrying out laser writing, it is preferred to add various laser absorbing dyes (in the case of using a general semiconductor laser of from 780 to 830 nm, a near infrared absorbing dye such as phthalocyanine, squarylium, azulenium, etc., can be used).

The foregoing various components are added to the liquid crystal polymer composition, it is preferred than each component is added in the range of from 0.01 to 5% by weight. A low-molecular weight liquid crystal compound can be added to the liquid crystal polymer composition in a range of from 1 to 20% by weight.

The liquid crystal polymer composition used in the present invention forms a multidomain structure in the liquid crystal phase showing a high light scattering property. Each domain constituting the multidomain is mainly formed by the orientation of the liquid crystalline side chain in the inside of the domain. That is, one domain becomes the state that the mesogenic side chain forming the assembly in the inside thereof is oriented to almost the same direction and as the result of the orientation, an optical anisotropy is formed, whereby the domain can be optically distinguished from other domain. Since the multidomain structure is composed of the assembly of these domains each showing the optical anisotropy, for improving the light scattering property, it is desirable that the oriented direction of each domain is random.

For obtaining a high light scattering property in the multidomain structure, it is desirable that the size of each domain of the assembly is about the wavelength of visible light, and the domain diameter in the maximum of the domain distribution number is preferably in the range of from 0.2 to 3 µm, more preferably from 0.2 to 1 µm, and particularly preferably from 100 to 800 nm. It is desirable that the range of the domain diameter distribution is almost uniform in such an extent that the difference between the smallest domain diameter and the largest domain diameter is not larger than 3 µm, preferably not larger than 1 µm, and more preferably not larger than about 500 nm. The multidomain structure having the sizes of this range and the distribution range is preferable since the multidomain structure strongly scatters the wavelengths of visible light to increase the white turbidity.

The heat-treatment method for controlling the multidomain structure of the liquid crystal polymer composition is explained.

The multidomain structure of the liquid crystal polymer composition can change the sizes and the density of the domains by the external temperature. That is, the multidomain structure can be controlled by a heat-treatment and can be changed to the slate of improved optical characteristics such as the light scattering property, etc.

For practicing the heat-treatment for controlling the multidomain structure, not only the heat-treatment is carried out at a single temperature for a definite time but also it preferred to practice the operation of continuously changing the temperature or stepwise changing the temperature with the passage of time. Practically, the heat-treatment can be carried out by maintaining the liquid crystal polymer composition in a furnace at a constant temperature for a definite time or by controlling the temperature of the furnace to change the temperature with the passage of time. In the case of producing the liquid crystal polymer layer by a continuous coating method, the heat-treatment can be carried out by blowing hot blast of a definite temperature with plural dryers (blowing dryer) or passing the high-temperature liquid crystal layer through a furnace kept at a constant temperature disposed in the production line.

If crosslinking of the liquid crystal polymer proceeds, the multidomain structure is almost fixed in the structure before crosslinking, whereby the sizes of the domains are not changed and the control of the multidomain becomes difficult. Thus, for improving the optical characteristics of the liquid crystal polymer composition, it is preferred to carry out the heat-treatment for controlling the multidomain structure before the initiation of the crosslinking reaction, that is before performing the heat-treatment for crosslinking the liquid crystal polymer composition.

The heat-treatment for controlling the multidomain structure is most effectively carried out at a temperature that the movement of the main chain of the high molecular weight compound in the liquid crystal polymer composition becomes active, that is, in the temperature range that the liquid crystal polymer composition shows a liquid crystal phase. The temperature range that the liquid crystal polymer composition shows a liquid crystal phase is a temperature range of from the glass transition point to the liquid crystal phase-isotropic phase phase-transition point, the temperature range differs according to the kind of the liquid crystal polymer composition being used, but is generally 0° to 200° C. and preferably from 20° C. to 150° C.

The liquid crystal phase-isotropic phase phase-transition temperature (Ti) is a phase transition temperature (°C.) that in the liquid crystal polymer composition, the phase transition of the liquid crystal phase and the isotropic phase occurs. Ti Is usually measured by a thermal analysis as the endothermic and exothermic peaks, and by an optical observation as the extinction and the revelation of the birefringence.

Ti is sometimes observed as a different value between the measurement at temperature raising and the measurement at temperature decreasing. When the phase transition is primary phase transition, the phase-transition temperature ($Ti_h$) at temperature raising differs from the phase-transition temperature ($Ti_c$) at temperature decreasing and generally $Ti_h$ is higher than $Ti_c$.

The liquid crystal phase-isotropic phase phase-transition of the liquid crystal polymer is usually first order phase transition, and the temperature difference between $Ti_h$ and $Ti_c$ may become about 10° C. Ti in the present invention may be $Ti_h$ or $Ti_c$. When the heat-treatment is carried out at a temperature range of lower than Ti (°C.) and not lower than Ti–20(°C.), $Ti_h$ is preferably applied. In the case of the heat temperature of decreasing the temperature from the isotropic phase to the liquid crystal phase, $Ti_c$ is preferably applied.

When the heat-treatment is carried out at a temperature nearer the isotropic phase phase-transition point, the viscosity is lowered and thus the multidomain structure can be controlled at a high speed, which is preferable in the present invention.

The multidomain structure obtained by the heat-treatment described above can maintain the structure by carrying out the heat-treatment for crosslinking the liquid crystal polymer composition thereafter. By maintaining the multidomain structure of the liquid crystal polymer composition thus obtained by crosslinking, the optical characteristics are stabilized even when the liquid crystal polymer composition is repeatedly used and the reproducibility is greatly improved.

As the heat-treatment for controlling the multidomain structure in the present invention, the following embodiments are preferred:

the heat-treatment for controlling the multidomain structure is carried out at a temperature range of lower than the isotropic phase-liquid crystal phase phase-transition temperature Ti and not lower than Ti–20° C.;

the heat-treatment for controlling the multidomain structure is a heat-treatment comprising continuously decreasing the temperature from a temperature higher than the isotropic phase-liquid crystal phase phase-transition temperature Ti of the liquid crystal polymer at a temperature decreasing rate of not higher than 20° C. per second; and the heat-treatment for controlling the multidomain structure is a heat-treatment comprising the steps of: continuously decreasing the temperature from a temperature higher than the isotropic phase-liquid crystal phase phase-transition temperature Ti at a temperature decreasing rate of not higher than 20° C. per second; and thereafter treating at a temperature lower than the isotropic phase-liquid crystal phase phase-transition temperature Ti and not lower than Ti–20° C.

As one of the heat-treatment methods for controlling the multidomain structure, a method can be employed which comprises carrying out the heat-treatment of the liquid crystal polymer composition in the liquid crystal phase temperature range. In the method, by heat-treating the liquid crystal polymer in the temperature range that the liquid crystal polymer composition forms a multidomain structure, the domains are grown from the state that the domains are small and the optical characteristics are low to form the multidomain structure having high optical characteristics. In this heat-treatment method, the time required for controlling the multidomain structure is determined by the heat-treatment temperature. That is, when the heat-treatment is carried out at a temperature range apart from Ti, a long time is required for growing the domains since the inside viscosity of the liquid crystal polymer is high, and when the heat-treatment is carried out near the Ti temperature, the growth of the domains is accelerated since the inside viscosity of the liquid crystal polymer is lowered. Furthermore, when the heat-treatment is carried out at a temperature higher than Ti, the liquid crystal polymer becomes an isotropic phase and the multidomain structure is vanished. Accordingly, it has been found that for efficiently carrying out in a short time, the heat-treatment is preferably carried out at a temperature of lower than Ti (°C.) and near Ti.

As another heat-treatment method for controlling the multidomain structure, a method can be employed which comprises carrying out the heat-treatment by decreasing the temperature from the isotropic phase temperature range of the liquid crystal polymer composition. The feature of this heat-treatment method is that by utilizing the coexisting region of the liquid crystal phase formed at phase transferring from the isotropic phase to the liquid crystal phase and the isotropic phase, the control of the multidomain structure is efficiently carried out in a short time. That is, the coexisting region becomes the state that the domains formed by the nucleus formation by temperature decreasing and the liquid crystal phase having a low viscosity coexist and by efficiently growing the domain in a short time, a multidomain structure having excellent optical characteristics can be formed. Since in the coexisting region, the isotropic phase and the liquid crystal phase are in a thermally equivalent state, the domain nuclei having no spatial strain can be uniformly formed. Accordingly, the distribution of sizes of the domains can be narrowed by carrying out the temperature-decreasing heat-treatment efficiently utilizing the coexisting region. On the other hand, when the heat-treatment is carried out at a temperature-decreasing rate near supercooling, that is, when before the nuclei of the domains are sufficiently formed, the liquid crystal polymer is cooled from the temperature region that the liquid crystal phase and the isotopic phase coexist to a liquid crystal phase temperature region apart from the foregoing temperature region, the nuclei of domains form nonuniformly and the growth of the domains are restrained.

In the present invention, for efficiently carrying out the temperature-decreasing heat-treatment of the liquid crystal polymer composition in a short time, it is necessary to select the temperature-decreasing rate which does not become a supercooled state. That is, in the present invention, it is necessary to continuously decrease the temperature from a temperature higher than the isotropic phase-liquid crystal phase phase-transition temperature Ti (°C.) to the liquid crystal phase at a temperature-decreasing speed of not higher than 20° C. per second, preferably not higher than 10° C. per second, more preferably not higher than 1.0° C. per second, and particularly preferably not higher than 0.1° C. per second. By carrying out the temperature-decreasing heat-treatment, the multidomain structure of the liquid crystal polymer composition can be controlled.

In the heat-treatment method in the present invention, the multidomain structure can be controlled by combining the two kinds of the methods described above. That is, by heat treating the liquid crystal polymer composition by continuously decreasing the temperature from the temperature higher than the isotropic phase-liquid crystal phase phase-transition temperature Ti (°C.) of the liquid crystal polymer composition to the liquid crystal phase at a temperature decreasing speed of not higher than 20° C. per second and thereafter in the temperature range of lower than the isotropic phase-liquid crystal phase phase-transition temperature Ti (°C.) and not lower than Ti–20(°C.), the multidomain structure of the liquid crystal polymer composition can be controlled. Detailed heat-treatment conditions of the method are applied and practiced similar to those described above.

When the liquid crystal polymer is used as a recording element of recording by reversibly changing the light scattering extent, the storage stability of the record depends upon the glass transition point (Tg) of the liquid crystal polymer composition and for improving the storage stability of the record, a material having a relatively high Tg is required. However, since a liquid crystal polymer composition having a high Tg has usually a high melt viscosity, it has been generally difficult to control the multidomain structure to one having a high light scattering property.

In the heat-treatment method of the present invention, on the other hand, the multidomain structure can be efficiently controlled in a short time even the liquid crystal polymer composition having a relatively high Tg described above and a liquid crystal polymer composition having an excellent light scattering property can be obtained. After efficiently controlling the multidomain structure in a short time, by crosslinking the liquid crystal polymer composition, the characteristics thereof can be further improved. The crosslinking method is carried out by applying heat, light, electron rays, etc., to the heat-treated liquid crystal polymer composition. In the case of using heat for the crosslinking, the heat-treatment for controlling the domain diameters and crosslinking may be simultaneously carried out and also, in addition to the heat-treatment step of controlling the domain diameters, a heat-treatment step for crosslinking may be applied. There is no particular restriction on the temperature at crosslinking if the temperature maintains the multidomain structure but the temperature range of lower than Ti which is the temperature range that the liquid crystal polymer composition shows a liquid crystal phase and higher than Tg is preferred. The multidomain structure is stabilized by carrying out the foregoing crosslinking and the liquid crystal polymer composition always showing a stabilized high light scattering property without changing the structure by an external temperature can be obtained.

The heat-treatment for crosslinking the liquid crystal polymer composition of this invention is explained.

The heat-treatment method for crosslinking the liquid crystal polymer composition may be not only the heat-treatment at a single temperature for a definite time but also a method of continuously changing the temperature or stepwise changing the temperature with the passage of time.

As to the heat-treatment temperature in the first stage of the heat-treatment, it is desirable to carry out the crosslinking reaction at a temperature lower than the liquid crystal phase-isotropic phase phase-transition temperature of the liquid crystal polymer composition. This is because if the liquid crystal polymer composition is heat-treated at a temperature higher than the liquid crystal phase-isotropic phase phase-transition temperature, the composition is phase-transferred to an optically isotropic and uniform state and controlled multidomain structure is broken. The liquid crystal phase-isotropic phase phase-transition temperature of the composition differs according to the composition of the liquid crystal polymer being used, etc., but it is preferred to carry out the heat-treatment for crosslinking the liquid crystal polymer at a temperature of usually not higher than 200° C., preferably not higher than 150° C., and more preferably not higher than 80° C.

It is desirable that the heat-treatment temperature for controlling the multidomain structure described above is higher than the heat-treatment temperature for crosslinking the liquid crystal polymer composition. In the case of carrying out the heat-treatments of two stages, the heat-treatment time for controlling the multidomain structure is frequently shorter than the heat-treatment time for crosslinking the liquid crystal polymer composition. Furthermore, in general, the sizes of the domains are more largely changed at a high temperature than a low temperature.

From the above-described matters, when the heat-treatment temperature for crosslinking is lower than the heat-treatment temperature controlling the multidomain structure, the multidomain structure set up to the desired size by applying the heat-treatment is not changed even when the heat-treatment for crosslinking is carried out for a long time and the liquid crystal polymer composition having desired optical characteristics can be obtained. Thus, for improving the optical characteristics of the optical element, it is necessary that the heat-treatment temperature for controlling the multidomain structure is higher than the heat-treatment temperature for crosslinking the liquid crystal polymer.

In the present invention, by employing the heat-treatment methods described above, after forming the liquid crystal polymer composition having the multidomain structure showing a high light scattering property, by crosslinking the liquid crystal polymer composition, the multidomain structure is stabilized and the optical element always showing a stable high light scattering property can be obtained.

The sheet-form substrate being used as the support substrate of the optical element in the present invention is explained.

As the sheet-form substrate, films of various polymers such as polyvinyl chloride, polypropylene, polyester (such as PET, etc.), polyimide, etc.; metal films, paper, etc., can be used. A colored film formed by dispersing a dye in a PET film, etc., a film formed by forming a colored layer on a PET film, etc., a vapor-deposited film formed by vapor depositing a metal layer having a high reflectance on the surface of a substrate, etc., are preferably used, and these films can be also utilized as a light-absorption layer, a colored layer, and a light-reflecting layer. Furthermore, as the substrate, a substrate having attached thereto an electrode can be used. The thickness of the light-absorption layer, the colored layer, and the light-reflecting layer is generally selected from the range of from 0.001 µm to 100 µm.

The liquid crystal polymer layer can be produced by any known method, such as a solution coating method using a solvent or a hot-melt coating method, on the sheet-form substrate. The thickness of the liquid crystal polymer layer is not particularly limited, and is preferably from 1 to 100 µm, and more preferably from 2 to 50 µm.

The surface protective layer being used in the present invention is explained.

The properties required for the surface protective layer include various properties such as an abrasion resistance, a heat resistance, a pressure resistance, a surface friction property, and a surface lubricant, and further include a low adhesive property at the heat-treatment temperature for crosslinking the liquid crystal polymer.

Examples of the materials suitable for these conditions include crosslinked resins excellent in the pressure resistance, which is a mechanical strength, an abrasion resistance and a heat resistance, such as ultraviolet setting resins, electron ray setting resins, thermosetting resins, etc. Since the ultraviolet setting resin and the electron ray setting resin form a film by a polymerization reaction of a polyfunctional monomer and a polyfunctional oligomer, a tough surface protective layer having a high mechanical strength can be formed.

Specific examples of the material being used for the surface protective layer in the present invention include polyfunctional oligomers having from 1 to 10 functional groups, such as polyester acrylate, polyester methacrylate, polyether acrylate, polystyryl methacrylate, polyether methacrylate, urethane acrylate, epoxy acrylate (in particular, epoxy acrylates each having a bisphenol A-type skeleton, bisphenol F-type skeleton, and a bisphenol S-type skeleton, respectively and phenol novolac-type epoxy acrylates), polycarbonate, polybutadiene acrylate, silicone acrylate, melamine acrylate, etc. Monofunctional monomers and polyfunctional monomers, such as 2-ethylhexyl acrylate, cyclohexyl acrylate, phenoxyethyl acrylate, 1,6-hexanediol acrylate, tetraethylene glycol diacrylate, etc., can also be preferably used. These materials may be used singly or preferably as a combination of them.

The surface protective layer can be formed by plural laminated layer by laminating plural layers each having a different composition. In particular, since it is difficult to simultaneously satisfy the adhesive property at the interface between the liquid crystal polymer layer and the lubricating property at the surface of the optical element by a single surface protective layer, it is preferred to give different functions to plural surface protective layers such that a first surface protective layer for improving the adhesive property with the liquid crystal polymer layer is formed and then a second surface protective layer for improving the lubricating property of the surface of the optical element on the surface of the first protective surface layer. Since the foregoing resin materials have the property that the adhesive property at the heat-treatment temperature for crosslinking the liquid crystal polymer is low, the glass transition temperature (Tg) of the resin material is preferably higher than the heat-treatment temperature and Tg is more preferably higher than 80° C. The thickness of the surface protective layer depends upon the kind of the material being used but is generally in the range of from 0.1 to 10 μm, preferably from 0.2 to 5 μm, and more preferably from 1 to 2 μm.

As a method of forming the surface protective layer in the present invention, in the case of using a ultraviolet curing resin, a method of coating a solution obtained by dissolving a mixture of the foregoing oligomer or monomer and a photopolymerization initiator preferably at a ratio of from 2 to 5% by weight in a solvent, etc., followed by controlling the viscosity on the recording layer composed of the liquid crystal polymer composition, if necessary heating the coated layer, and setting by irradiating ultraviolet rays can be applied. It is preferred to form a plural surface protective layer by forming, if necessary, a second and third surface protective layers on the surface protective layer thus formed.

For producing the optical element of the present invention, after forming the foregoing liquid crystal polymer layer on a sheet-form substrate as a support substrate using a continuous coating means, etc., the heat-treatment step of the first step for controlling the multidomain structure is applied. Then, after forming a surface protective layer on the liquid crystal polymer layer, the heat-treatment step of a second step for crosslinking the liquid crystal polymer layer is applied. After finishing these steps, if necessary, a second and third surface protective layers can be further formed on the surface protective layer.

By carrying out the heat-treatment for crosslinking the liquid crystal polymer layer in the state that the sheet-form substrate having formed thereon the liquid crystal polymer layer is in a roll form, the production efficiency of the optical element can be improved. In this case, since the surface protective layer is formed on the liquid crystal polymer layer, the surface adhesive property of the optical element can be lowered. Accordingly, when the optical element is wound in a roll form, the phenomenon that the overlapped surface of the optical element strongly adheres to the back surface of the sheet-form substrate disposed thereon and the liquid crystal polymer layer is released from the surface of the substrate does not occur.

After finishing these steps, if necessary, a second and third surface protective layers can be formed on the surface protective layer. For example, by forming the first surface protective layer for improving the surface releasing property at heat-treating by crosslinking the liquid crystal polymer layer of the second step, forming the second surface protective layer for improving the heat resistance of the optical element, and forming the third surface protective layer for improving the abrasion resistance of the optical element, the various properties of the optical element can be improved.

A method of reversibly controlling the light scattering property in the case of using the optical element of the present invention as a re-writable material is explained.

The light scattering property of the liquid crystal polymer layer can be reversibly controlled by utilizing heat only. The liquid crystal polymer layer of the optical element of this invention shows a light scattering state (white turbidity state) originated in the multidomain structure at the first stage. By partially heating the liquid crystal polymer layer of the state using a thermal head, a laser light, etc., the liquid crystal polymer composition is converted into an isotropic state and by quickly cooling the layer, the heated and cooled portion is fixed in the isotropic state. As the result thereof, the region becomes a transparent state showing a low light scattering property, whereby the light scattering property is restrained and an information can be recorded.

On the other hand, in the case of erasing the recorded information by increasing the light scattering property, after heating the liquid crystal polymer layer, by cooling slowly, the layer can be returned to the initial large light scattering state. That is, by reversibly repeating the light scattering state and the transparent state many times, recording and erasing of an information can be performed. The heating means for controlling the light scattering property, when, for example, a thermal head or a laser light is used, can be attained by controlling the pulse width or the energy to be applied. The reversible control of the light scattering property can be practiced by utilizing an electric field or a magnetic field.

The present invention will be described in more detail below by referring to Examples, but the present invention is not construed as being limited thereto.

EXAMPLE 1

By polymerizing 1.9 g of 4-methacryloxyhexyloxy-4'-cyanobiphenyl as a mesogenic monomer and 0.1 g of 2-hydroxyethyl acrylate as a reactive monomer using AIBN as an initiator and tetrahydrofuran as a solvent and carrying out a precipitation purification 3 times using ethyl alcohol, 1.9 g of the liquid crystal polymer shown by following structural formula (I) was obtained.

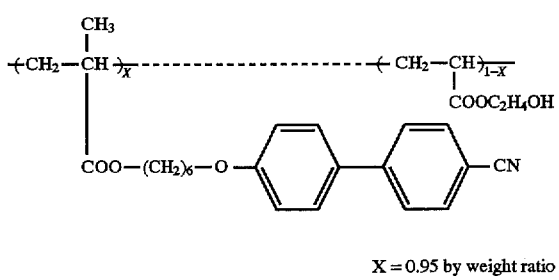

X = 0.95 by weight ratio

A solution obtained by adding 0.05 g of a polyfunctional isocyanate compound, Colonate HX (trade name, made by Nippon Polyurethane K.K.) and 3.0 g of methyl ethyl ketone (MEK) as a solvent to 1.0 g of the liquid crystal polymer obtained above was coated on an aluminum-vapor-deposited PET film of 100 μm in thickness using a blade coaxer and dried to form a liquid crystal polymer layer having a thickness of about 6 μm. The liquid crystal polymer layer after coated and dried was in a white turbid state and was a light scattering control layer. Ti (the liquid crystal phase-isotropic phase phase-transition temperature) of the liquid crystal polymer composition before crosslinking was about 100° C.

Then, after heat annealing the liquid crystal polymer layer in an oven of 90° C. which was the temperature that the liquid crystal polymer showed a liquid crystal phase for 5 minutes, the reaction was carried out in an oven of 60° C. for 48 hours to crosslink the liquid crystal polymer layer. Furthermore, a ultraviolet setting composition (Arronix UV, trade name made by Toagosei Chemical Industry Co., Ltd.) was coated thereon as a protective layer and the protective layer having a thickness of about 2 μm was formed on the liquid crystal polymer layer by setting the layer using a high-pressure mercury lamp to prepare an optical element. In this case, the domain diameter in the maximum of the domain distribution number in the multidomain structure was 300 nm.

EXAMPLE 2

By following the same polymerization as Example 1 using 1.8 g of the same mesogenic monomer as in Example 1, 0.1 g of the same reactive monomer as in Example 1, and 0.1 g of butyl acrylate, a liquid crystal polymer shown by following structural formula (II) was synthesized.

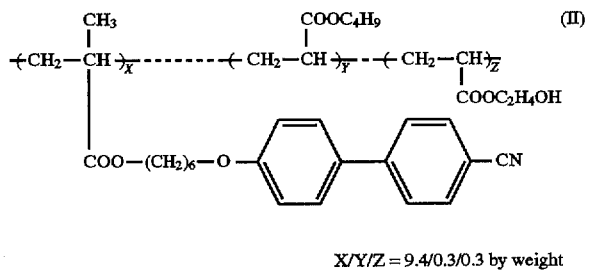

X/Y/Z = 9.4/0.3/0.3 by weight

A solution obtained by adding 0.05 g of a polyfunctional isocyanate, Colonate HX (trade name, made by Nippon Polyurethane K.K.) as a crosslinking agent and 3.0 g of MEK as a solvent to 1.0 g of the liquid crystal polymer thus obtained was coated on an aluminum-vapor-deposited PET film of 100 μm in thickness using a blade coater and dried to form a liquid crystal polymer layer having a thickness of about 6 μm. The liquid crystal polymer layer after coated and dried was in a white turbid state and was a light scattering control layer. Also, Ti temperature of the composition before crosslinking was about 90° C. Then, a heat annealing treatment and a crosslinking reaction were simultaneously carried out in an oven of 80° C. that the liquid crystal polymer showed a liquid crystal phase for 48 hours. Furthermore, a protective layer was formed on the liquid crystal polymer layer by the same manner as in Example 1 to prepare an optical element. In this case, the domain diameter in the maximum of the domain distribution number in the multidomain structure was 330 nm.

EXAMPLE 3

By following the same copolymerization as Example 1 using 1.8 g of the same mesogenic monomer as in Example 1, 0.1 g of glycidyl acrylate as a reactive non-mesogenic monomer, and 0.1 g of butyl methacrylate as a non-mesogenic monomer, a liquid crystal polymer shown by following structural formula (III) was synthesized.

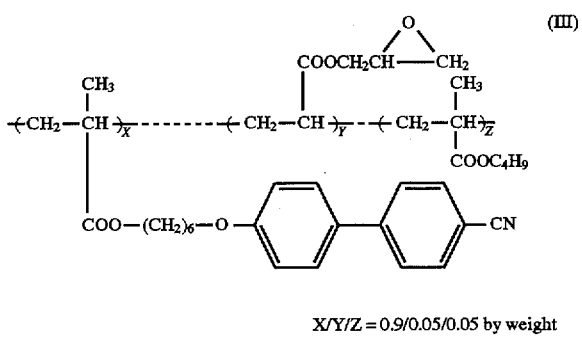

X/Y/Z = 0.9/0.05/0.05 by weight

A solution obtained by adding 0.02 g of a polyfunctional amine compound, hexamethylenediamine, and 3.0 g of MEK as a solvent to 1.0 g of the liquid crystal polymer thus obtained was coated on an aluminum-vapor-deposited PET film of 100 μm in thickness using a blade coater and dried to form a liquid crystal polymer layer having a thickness of about 6 μm. The liquid crystal polymer layer after coated and dried was in a white turbid state and was a light scattering control layer. Also, Ti temperature of the composition before crosslinking was about 90° C. Then, a heat annealing treatment was carried out in an oven of 85° C. for 2 minutes and thereafter, a crosslinking reaction was carried out in an oven of 60° C. for 48 hours. Furthermore, a protective layer was formed on the liquid crystal polymer layer by the same manner as in Example 1 to prepare an optical element. In this case, the domain diameter in the maximum of the domain distribution number in the multidomain structure was 280 nm.

EXAMPLE 4

By following the same polymerization as Example 1 using 3.9 g of the same mesogenic monomer as in Example 1, i.e., 4-acrylohexyloxy-4'-cyanobiphenyl, 0.12 g of the same reactive monomer as in Example 1, and 0.08 g of butyl acrylate, a liquid crystal polymer shown by following structural formula (IV) was synthesized.

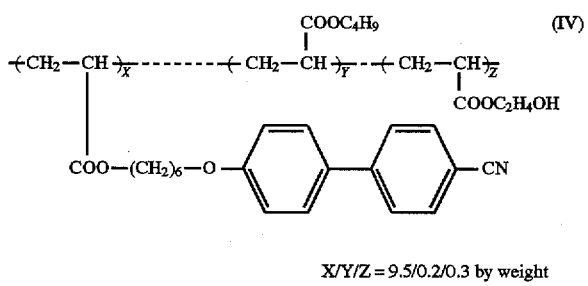

X/Y/Z = 9.5/0.2/0.3 by weight

A solution obtained by adding 0.03 g of a polyfunctional isocyanate compound, 4,4'-diphenylmethane diisocyanate and 3.0 g of MEK as a solvent to 1.0 g of the liquid crystal polymer thus obtained was coated on an aluminum-vapor-deposited PET film of 100 μm in thickness using a blade coater to form a liquid crystal polymer layer having a thickness of about 6 μm, After coating, the white turbidity of the liquid crystal polymer layer was low and the layer was not a light scattering control layer having excellent optical characteristics. Also, the Ti temperature of the composition before crosslinking was about 90° C. Then, for carrying out the heat-treatment for multidomain controlling, the coated film was placed in an oven of 100° C. that the liquid crystal polymer showed an isotropic phase, the temperature was continuously decreased to 80° C. by controlling the temperature controller of the oven at a temperature decreasing speed of 0.1° C. per second to control the multidomain structure. Thereafter, for carrying out a crosslinking reaction, the heat-treatment was carried out in an oven of 60° C. for 48 hours. Furthermore, a protective layer was formed by the same manner as in Example 1 to prepare an optical element. In this case, the domain diameter in the maximum of the domain distribution number in the multidomain structure was 380 nm.

Comparative Example 1

By following the same procedure as Example 1 except that the isocyanate crosslinking reaction was not carried out for the liquid crystal polymer (Structural Formula 1) synthesized in Example 1, an optical element was prepared. The light-scattering control film after preparation was in a white turbid state.

Comparative Example 2

By following the same procedure as Example 1 except that the heat annealing treatment was not carried out for the liquid crystal polymer (Structural Formula 1) synthesized in Example 1, an optical element was prepared. The light-scattering control film after preparation was in a white turbid state.

The reproducibility of the light-scattering control was evaluated as follows:

As the information record for each optical element, a region (transparent state) of reducing the light scattering property was formed using a thermal printer (8 dots/mm, 0.3 mJ/dot). As information erasing to each optical element, the region was returned to a state of a large light scattering property (light-scattering state) using a hot stamp (130° C.).

The reflection optical densities before and after carrying out the annealing treatment, and after repeating once and 100 times recording/erasing were measured using X-rite 968 (trade name, manufactured by X-rite K.K.), and the repeating reproducibility and the stability of the display quality were evaluated.

The results are shown in Table 1 below.

TABLE 1

(Evaluation Results)

|  | Optical Density Before Annealing (a)* | Optical Density After Annealing (a) | Optical Density After Erasing (once) (a) | Optical Density After Recording/ Erasing 100 times (a) |
|---|---|---|---|---|
| Example 1 | 0.37 | 0.22 | 0.23 | 0.21 |
| Example 2 | 0.31 | 0.20 | 0.20 | 0.21 |
| Example 3 | 0.29 | 0.24 | 0.23 | 0.24 |
| Example 4 | 0.29 | 0.22 | 0.22 | 0.22 |
| Comparative Example 1 | 0.60 | 0.41 | 0.96 | 1.2 |
| Comparative Example 2 | 0.37 | 0.37 | 0.371 | 0.38 |

*Light-scattering state.

As shown in the above table, in Examples 1 to 4, after erasing once and after repeating erasing 100 times, the white turbidity of the light-scattering state (reflection optical density) is not changed and there is an excellent reproducibility of white. On the other hand, in Comparative Example 1, since the crosslinking reaction is not carried out, the effect of annealing gives no influence on the optical density of the repeating property. Since in Comparative Example 2, there is no effect of annealing, the white turbidity is not optimized in the initial state and the white turbidity shows a low value. Such poor state of the white turbidity was reproduced many times in the display (white turbidity) characteristics.

From the above results, it becomes clarified that the optical medium prepared by the method for producing an poitical element according to the present invention is excellent in the reproducibility of recording/erasing and the display characteristics.

As described above, in the present invention, by carrying out the heat-treatment for crosslinking the liquid crystal polymer in the state of forming the surface protective layer on the surface of the liquid crystal polymer layer, the surface of the optical element obtained is restrained in the adhesive property and thus, when the heat-treatment is applied in the state of wound in a roll form, the phenomenon of adhering the liquid crystal polymer layer to the sheet-form substrate such as a film, etc., can be prevented, whereby the production efficiency of the optical element can be improved. Also, by carrying out the heat-treatment for controlling the crystal structure before crosslinking the liquid crystal polymer layer, an optical element showing a stable high light stability and having improved durability and recording/erasing characteristics can be produced na the optical element obtained can be applied as a light controlling element, a light recording medium, a light modulation element, and a rewritable recording medium.

Furthermore, in the present invention, by carrying out the heat-treatment for controlling the multidomain structure of the liquid crystal polymer composition under the specific condition, the domain diameters are efficiently controlled to definite sizes in a short time, whereby an optical element having a high light-scattering property can be obtained and also by using the method, the production efficiency of the optical element can be improved. Also, by further crosslinking reacting the liquid crystal polymer composition obtained by the foregoing heat-treatment, the multidomain structure is stabilized and thus, excellent optical characteristics are obtained and also information recording layer having the excellent stability and reproducibility in the step of repeated heating/cooling (recording/erasing, etc.) can be obtained, whereby the applicable range of the present invention is enlarged.

While the invention has been described in detail and with reference to specific examples thereof, it will be apparent to one skilled in the art that various changes and modifications can be made therein without departing from the spirit and scope thereof.

What is claimed is:

1. A method for producing an optical element, said method comprising the steps of:

forming a liquid crystal polymer layer on a sheet-form substrate;

forming a surface protective layer on said liquid crystal polymer layer; and thereafter carrying out a heat-treatment for crosslinking said liquid crystal polymer at a temperature not higher than 80° C. and not higher than the liquid phase-isotropic phase phase-transition temperature of a liquid crystal polymer constituting said liquid crystal polymer layer, wherein said sheet-form substrate is wound in a roll form.

2. A method for producing an optical element as claimed in claim 1, wherein said liquid crystal polymer layer comprises a composition comprising a liquid crystal polymer containing a mesogenic monomer unit and a non-mesogenic monomer unit.

3. A method for producing an optical element, said method comprising the steps of:

forming a layer of a liquid crystal polymer having a multidomain structure on a sheet-form substrate;

carrying out a first heat-treatment for controlling the multidomain structure of said liquid crystal polymer layer;

forming a surface protective layer on said liquid crystal polymer layer; and thereafter carrying out a second heat-treatment for crosslinking said liquid crystal polymer layer.

4. A method for producing an optical element as claimed in claim 3, wherein the temperature of said first heat-treatment for controlling the multidomain structure is higher than the temperature of said second heat-treatment for crosslinking said liquid crystal polymer layer.

5. A method for producing an optical element as claimed in claim 3, wherein said second heat-treatment for crosslinking said liquid crystal polymer layer is carried out at a temperature of not higher than the liquid crystal phase-isotropic phase phase-transition temperature of said liquid crystal polymer.

6. A method for producing an optical element as in claim 3, wherein said method comprises the steps of:

forming a layer of a liquid crystal polymer having a multidomain structure on a sheet-form substrate;

carrying out a first heat-treatment for controlling the multidomain structure of said liquid crystal polymer layer; thereafter forming a first surface protective layer on said liquid crystal polymer layer;

carrying out a second heat-treatment for crosslinking said crystal polymer layer; and forming a second surface protective layer on said first protective layer.

7. A method for producing an optical element as claimed in claim 3, wherein said first heat-treatment for controlling the multidomain structure is carried out at a temperature range of lower than the isotropic phase-liquid crystal phase phase-transition temperature Ti and not lower than Ti–20° C.

8. A method for producing an optical element as claimed in claim 7, wherein by carrying out said first heat-treatment for controlling the multidomain structure, the diameter of an individual domain of the multidomain structure in the maximum of a domain size distribution curve is made from 0.2 to 3 μm.

9. A method for producing an optical element as claimed in claim 3, wherein said first heat-treatment for controlling the multidomain structure is a heat-treatment comprising continuously decreasing the temperature from a temperature higher than the isotropic phase-liquid crystal phase phase-transition temperature Ti of said liquid crystal polymer at a temperature decreasing rate of not higher than 20° C. per second.

10. A method for producing an optical element as claimed in claim 9, wherein by carrying out said first heat-treatment for controlling the multidomain structure, the diameter of an individual domain of the multidomain structure in the maximum of a domain size distribution curve is made from 0.2 to 3 μm.

11. A method for producing an optical element as claimed in claim 3, wherein said first heat-treatment for controlling the multidomain structure is a heat-treatment comprising the steps of:

continuously decreasing the temperature from a temperature higher than the isotropic phase-liquid crystal phase phase-transition temperature Ti at a temperature decreasing rate of not higher than 20° C. per second; and thereafter treating at a temperature lower than the isotropic phase-liquid crystal phase phase-transition temperature Ti and not lower than Ti–20° C.

12. A method for producing an optical element as claimed in claim 11, wherein by carrying out said first heat-treatment for controlling the multidomain structure, the diameter of an individual domain of the multidomain structure in the maximum of a domain size distribution curve is made from 0.2 to 3 μm.

* * * * *